3,046,825
FILLER MEMBER FOR POSITIVELY ATTACHING AND POSITIONING A SHEAR KNIFE
Wallace M. Thompson, Cordele, Ga., assignor to Harris Foundry & Machine Co., Cordele, Ga., a corporation of Georgia
Filed June 22, 1959, Ser. No. 821,910
3 Claims. (Cl. 83—698)

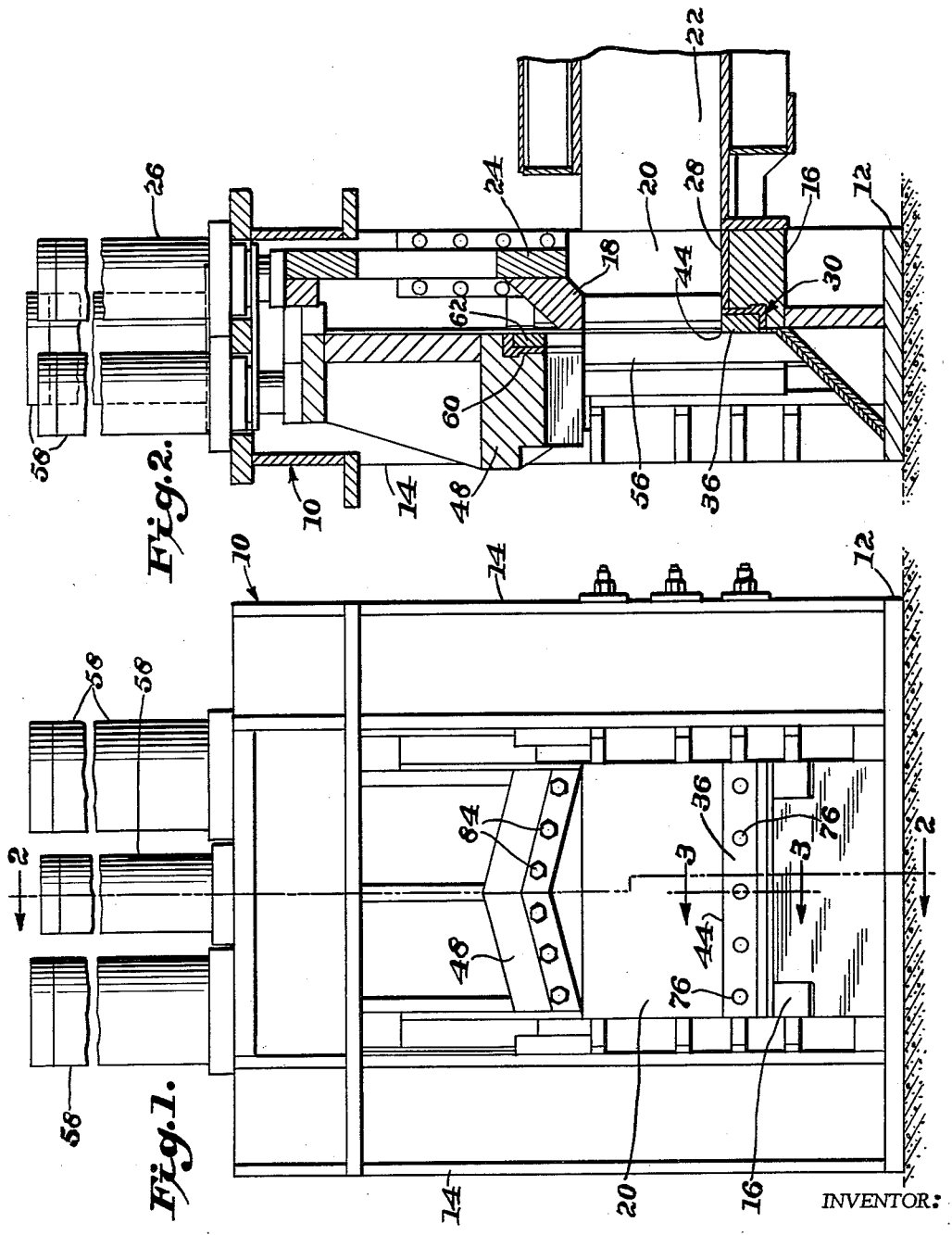

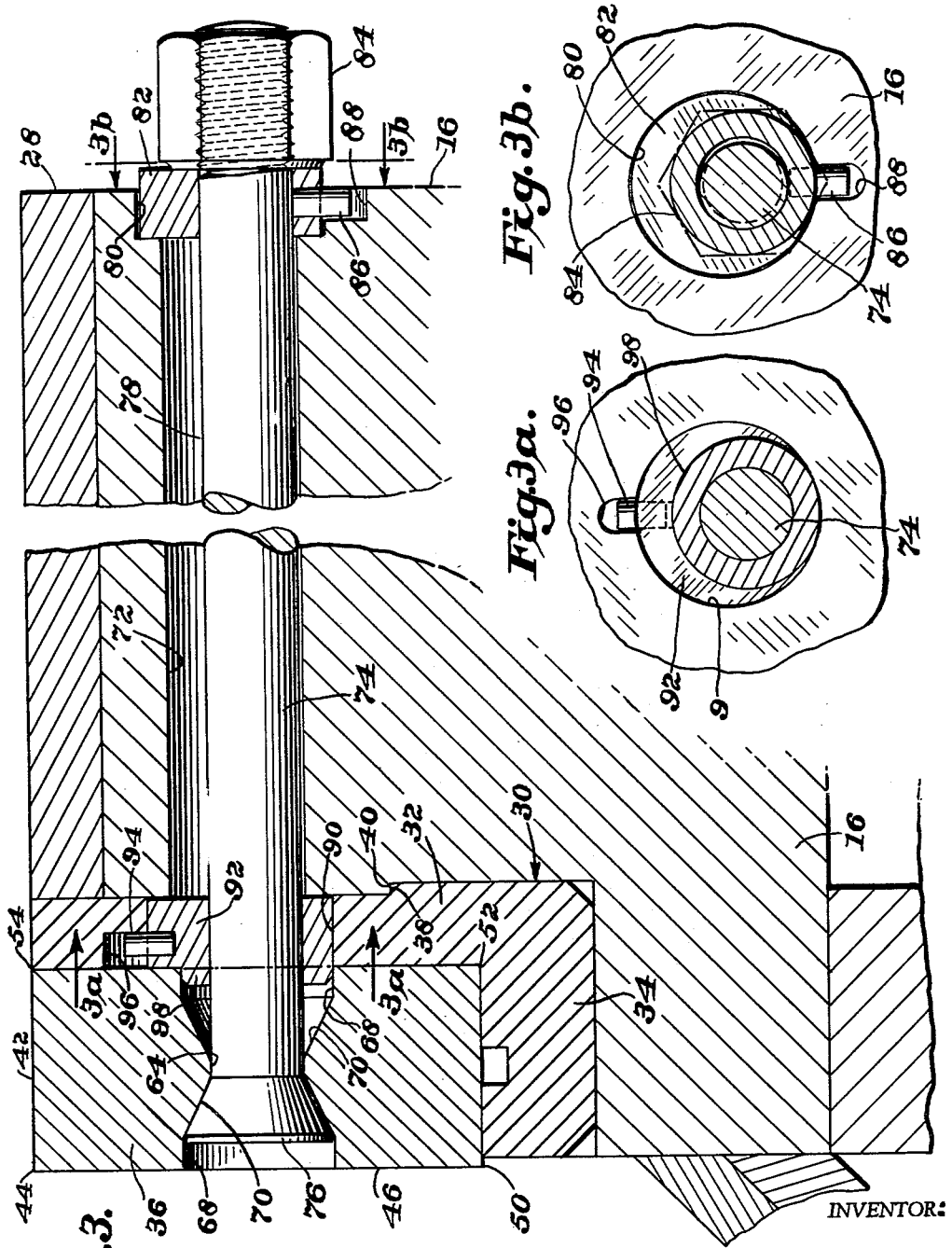

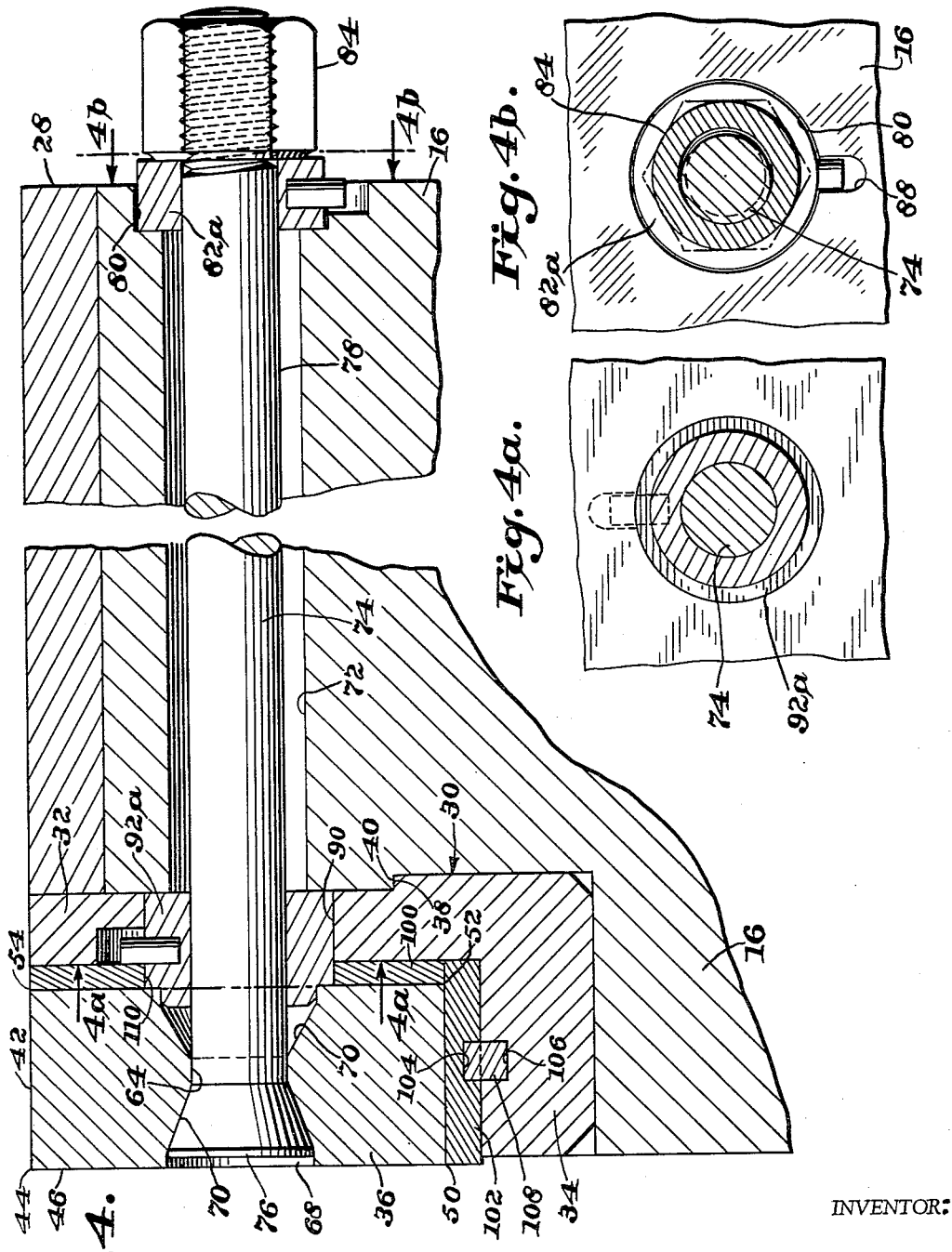

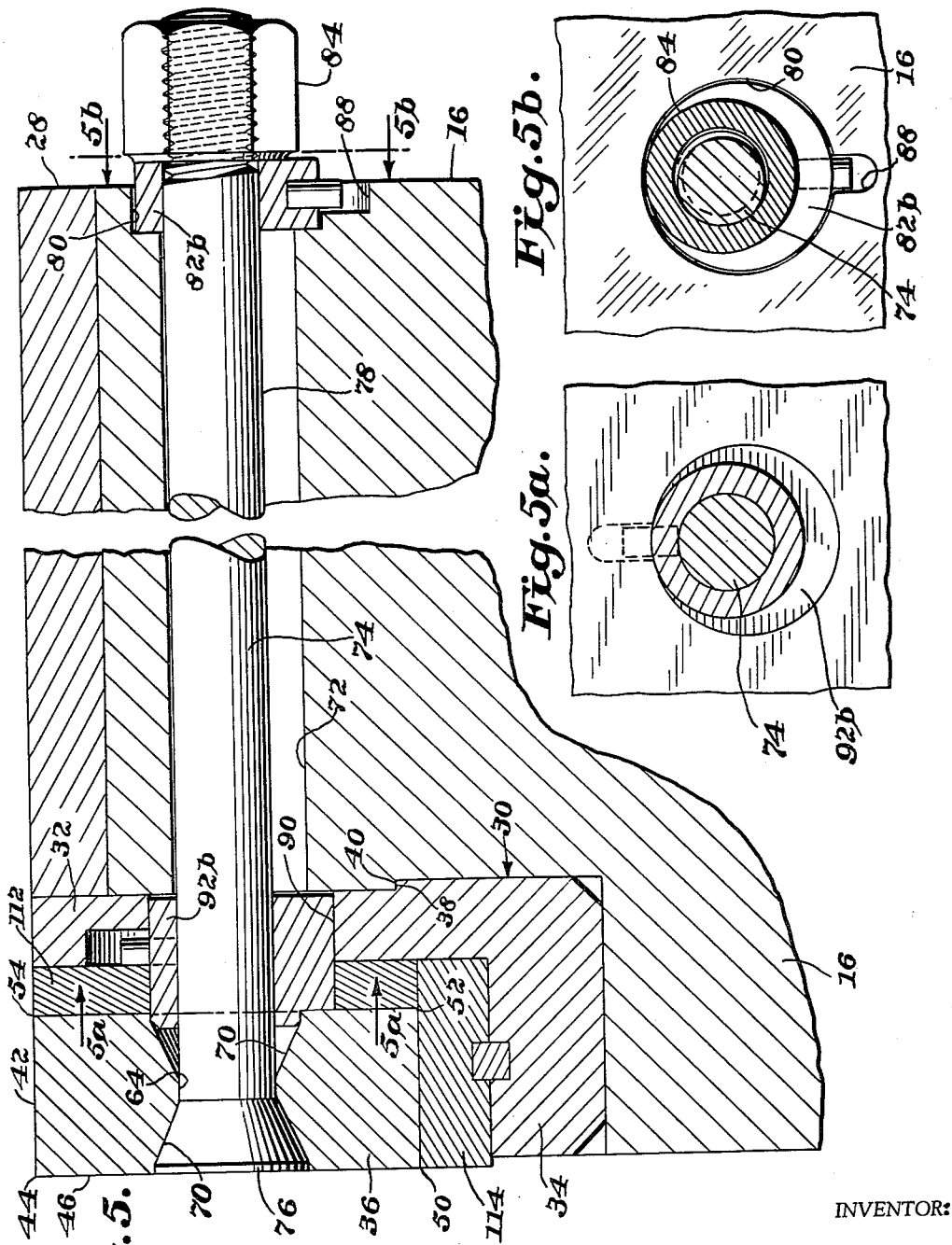

This invention relates to improvements in shears or shearing machines. More particularly, this invention pertains to improvements in the method and apparatus for the attachment of shear blades or knives in a shearing machine, especially a metal shear. The knives or cutting blades of a metal shear, although of expensive material, such as carbide steel, become dull in time, with a resulting impairment of their cutting efficiency. Consequently, such knives ordinarily are replaced, at considerable expense, when they become dull.

Accordingly, it is an object of this invention to provide an improved method and apparatus for securing the cutting blade of a metal shear in place in the machine in such a manner that the blade can be removed from the machine, ground to resharpen its cutting edge, and replaced in the machine so that the sharpened edge assumes the same position in the machine that it had before being sharpened, even though some metal was removed from the blade during the sharpening operation.

It is another object of this invention to provide an improved attachment for securing a shear blade in place in its seat and which will permit a blade to have four cutting edges and to be reversible top to bottom and front to back so that the four cutting edges can be successively positioned for operative usage as they become dull.

It is a further object of this invention to provide a simple and inexpensive attachment for securing a shear blade in place in its seat in such a manner that it can readily be repositioned for proper operation after re-grinding to sharpen a dulled cutting edge, and at the same time will be retained securely in its seat against any displacement on disengagement of the two cooperating cutting edges of the shear when any metal being cut happens to become wedged between the knives or shear blades.

Other objects and advantages of the invention will be evident from the following description and accompanying drawings in which:

FIGURE 1 is a front elevational view of a metal shear embodying this invention.

FIGURE 2 is a vertical sectional view, taken substantially on line 2—2 of FIGURE 1.

FIGURE 3 is an enlarged fragmentary sectional view taken substantially on line 3—3 of FIGURE 1 and illustrating the details of the improved shear blade attachment embodying this invention.

FIGURES 3a and 3b are sectional views taken respectively on lines 3a—3a and 3b—3b of FIGURE 3.

FIGURES 4, 4a and 4b are views corresponding to FIGURES 3, 3a and 3b, respectively, but illustrating the attachment after the cutting knife or blade has been ground to sharpen its cutting edges.

FIGURES 5, 5a and 5b are views corresponding to FIGURES 4, 4a and 4b, respectively, but illustrating the attachment after the shear blade has been sharpened a second time.

Referring now to FIGURES 1 and 2 of the drawings there is shown a relatively conventional scrap metal shear having a frame which includes top and bottom cross members 10 and 12 connected by upright side members 14. Positioned above the bottom member 12 and extending between the side members 14 is a transverse bed member 16. Spaced above the bed member 16 is a transverse member 18 that cooperates with the bed member 16 to define an opening 20 through which material to be sheared is fed, as from a charging box 22, as best shown in FIGURE 2. Immediately to the rear of the opening is a vertically reciprocating clamp or hold-down device 24 operable by a hydraulic motor 26 disposed on top of the top member 10 of the shear frame. On its upper side, the bed member 16 may be provided with a detachable liner plate 28, while at its forward edge the bed member is recessed and provided with a channel-shaped liner 30 having back and bottom, i.e., outwardly and upwardly facing, walls 32 and 34, respectively, which are perpendicular to each other and which define a seat for a shear blade or shear knife 36 as shown best in FIGURE 3.

For reasons later explained, the back surface of the recess in the bed member 16 is undercut to provide a downwardly facing shoulder 38 engaging a complementary shoulder 40 on the liner 30. Preferably, the blade 36 is substantially rectangular in transverse section with its upper face 42 disposed substantially flush with the top of the seat liner 30 which, in turn, is substantially flush with the liner plate 28, so that any scrap metal (not shown) to be sheared may be pushed, without obstruction, from the charging box 22 toward the operative cutting edge 44 of the blade which is formed by the right angle intersection of its upper and other faces 42 and 46. It also will be noted that the outer face 46 of the blade 36 projects slightly outwardly beyond the outer edge of the bottom wall 34 of the liner 30, so that there will be no interference with the vertically reciprocating shearing head 48 of the machine. The intersection of the other two longitudinal faces of the blade 36 with each other and with the upper and outer faces 42 and 46 defines three other cutting edges 50, 52 and 54, each of which can be located in an operative position, as later explained.

The shearing head 48 of the machine, shown in FIGURES 1 and 2 of the drawings, is guided for vertical reciprocation in guideways 56 formed on the inner sides of the upright side members 14 of the machine, and the head is moved vertically by reciprocating hydraulic motors 58 secured on top of the top cross member 10 of the machine frame. The lower face or surface of the shearing head 48 is generally in the shape of an inverted V having a large obtuse included angle so that the shearing action of the head, in conjunction with the stationary cutting blade 36, will be generally in the nature of scissor-like cutting. The lower inner edge of the shearing head 48 is recessed and provided with a liner 60 that defines a blade seat substantially identical in transverse section to the seat for the stationary blade 36 of the machine. Of course, the blade seat on the shearing head 48 is in the shape of an inverted V, in elevational view, and the blade 62 secured therein preferably is formed in two parts separated at the apex of the V.

Referring now to FIGURES 1, 3, 3a and 3b of the drawings, it will be seen that the stationary blade 36 is provided with a plurality of bolt holes 64 extending therethrough, such holes being symmetrically arranged with respect to the midpoint of the length of the blade, and disposed midway between the upper and lower faces of the blade, as shown best in FIGURES 1 and 3. Likewise, each part of the blade 62 on the shearing head 48 is provided with a plurality of bolt holes identical to the holes 64 and arranged symmetrically with respect to the midpoint of the length of the corresponding blade part and located midway between the upper and lower faces of the blade part. Each blade bolt hole is provided with identical counterbores at its opposite ends, each counterbore preferably including an outer cylindrical section 68 merging at its inner end with an inner frusto-conical section 70, as shown best in FIGURE 3. Extending through the bed member 16 are a plurality of bolt holes 72 aligned generally with the holes 64 in the blade 36. From an inspection of FIGURE 3 it will be seen, however, that each bed bolt hole 72 is of considerably greater diameter than the minimum diameter of each blade bolt hole 64 and is offset upwardly relative to the latter when a new blade 36 is secured in position, as shown in FIGURE 3.

Extending through each aligned pair of bolt holes 64 and 72 is a bolt 74 having a tapered head 76 substantially complementary to and snugly fitting in the frusto-conical section 70 of the counterbore at the outer end of the blade bolt hole 64. The diameter of the shank 78 of the bolt 74 is substantially equal to the minimum interior diameter of the blade bolt hole 64. A counterbore 80 is provided at the rear end of the bed bolt hole 72 for the reception of a filler member in the form of an eccentric washer 82 through which the shank 78 of the bolt 74 passes. The filler member 82 snugly fits within the counterbore 80 and its eccentricity is such that the bolt 74 is held in precise alignment with the blade bolt hole 64 and perpendicular to the outer face 46 of the blade 36. A nut 84 is secured on the threaded end of the bolt 74 and bears against the member 82 to thus securely retain the blade 36 in position in its seat. In order to restrain the member 82 against rotation, the latter is provided with a radially projecting pin 86 receivable in a corresponding notch or recess 88 in the side wall of the counterbore 80. Thus, the outer periphery of the filler assembly, which includes the member 82 and the pin 86, is noncircular, as is also the assembly-receiving recess which includes the counterbore 80 and notch 88.

At its forward end the bed bolt hole 72 likewise is provided with what may be termed a counterbore in the form of an enlarged coaxial circular opening 90 in the back wall 32 of the seat liner 30. Disposed in the liner opening 90 is another filler member in the form of an eccentric washer 92, the eccentricity of which is such as to maintain the forward end of the bolt 74 in precise alignment with the bolt hole 64 in the blade. Again, in order to restrain the washer 92 against rotation, the latter may be provided with a radial pin 94 receivable in a corresponding notch or recess 96 in the side wall of the liner opening 90. Preferably, the washer 92 is provided, on its forward side, with a circular boss 98 coaxial with the opening through the washer and which is snugly receivable in the cylindrical section 68 of the counterbore at the rear end of the blade bolt hole 64.

From the foregoing description and from the showing of FIGURES 3, 3a and 3b, it will be seen that the stationary shear blade 36 is securely retained in place in its seat with the head 76 of the bolt 74 seated perfectly in the frusto-conical section 70 of the counterbore at the outer end of the blade bolt hole 64. It likewise will be seen that the boss 98 on the washer 92 cooperates with the bolt head 76 to securely fasten the blade 36 in its seat against any movement relative thereto. It further will be noted that if any upward unseating forces are exerted on the blade 36, upward movement of the blade will be positively prevented by reason of the washer 92. In this connection, it will be seen that the engaging shoulders 38 and 40 on the liner 30 and bed member 16 positively prevent any upward movement of the liner 30 relative to the bed member 16. Upward unseating forces of the aforedescribed character can readily occur when metal becomes jammed or wedged between the knife 62 on the shearing head 48 and the stationary knife 36 and the motors 58 are operated to move the shearing head upwardly, i.e., in a direction to disengage the knives.

The attachment of the parts of the blade or knife 62 on the shearing head 48, although not illustrated in detail in the drawings, is identical to that shown in FIGURES 3, 3a and 3b for the attachment of the bed knife 36 in its seat. It will be seen that because the bolt holes in each blade or blade part are arranged symmetrically with respect to the midpoint of the length of each blade, and because the series of holes in each blade or blade part is arranged along a line spaced midway between the top and the bottom faces of each blade, that each blade is provided with four usable cutting edges 44, 50, 52 and 54. The four edges on the bed blade 36 can readily be used by reversing the blade front to back and top to bottom. It likewise will be seen that the four cutting edges on each part of the shearing head knife 62 can be used by reversing each part both front to back and top to bottom, and also by exchanging the positions of the parts and reversing them front to back, and then again front to back and top to bottom.

After all of the edges 44, 50, 52 and 54 of the blades have been used and dulled, as described above, the blades may be removed, by unscrewing the nuts 84 and removing the bolts 74. All four longitudinal faces of the blades are then ground down sufficiently to sharpen the cutting edges. The blades are then replaced in their seats, but with a shim 100 between the blade and the back wall 32 of the seat liner 30 and another shim 102 between the blade and the bottom wall 34 of the seat liner, as shown in FIGURE 4, so that the operative sharpened cutting edge 44 of the blade occupies the identical position which it did before being sharpened. In other words, the grinding operation removes metal from the four faces of the blade so that unless properly proportioned shims 100 and 102 are used, the operative sharpened cutting edge 44 will be improperly positioned for cooperation with the other blade or knife of the machine.

It will be noted that the horizontal shim 102 is provided with a longitudinal keyway 104 in its undersurface aligned with a corresponding keyway 106 in the bottom wall 34 of the seat liner 30. A key 108 is disposed in these keyways 104 and 106 to prevent lateral displacement of the shim 102. It also will be noted that the upright shim 100 is provided with an opening 110 corresponding to and aligned with the cylindrical section 68 of the counterbore at the rear end of the blade bolt hole 64.

In order to properly position the bolt 74 within the bed bolt hole 72, in the newly-assumed slightly upwardly offset position of the sharpened blade, the eccentric washers 82 and 92 shown in FIGURES 3, 3a and 3b of the drawings are replaced by similar filler members 82a and 92a of different or even no eccentricity, as shown in FIGURES 4, 4a and 4b. It also will be seen that in the new position of the sharpened blade 36, the head 76 of the bolt 74 is still countersunk beneath the outer upright face 46 of the blade so as to continue to permit unobstructed operation of the shearing head 48.

Referring now to FIGURES 5, 5a and 5b, there is shown the position that the parts will assume after the blade 36 has been resharpened a second time. Again, shims 112 and 114 are used of a thickness sufficient to properly position the exposed resharpened edge 44 of the blade 36 with relation to its seat, and also filler members 82b and 92b of a still different eccentricity are employed to maintain the bolt 74 precisely perpendicular to the blade 36.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a shearing machine the combination comprising: a shear blade seat; a shear blade disposed in said seat, said blade having two exposed substantially planar faces which intersect to form a cutting edge and a bolt hole extending through one of said faces; means defining a bolt hole extending through a wall of said seat in general alignment with said blade bolt hole and having a noncircular portion adjacent to said seat; a bolt extending through said holes and engaged with said blade against radial movement relative thereto, the diameter of the shank of said bolt being considerably less than the minimum transverse dimension of said seat wall hole normal to said edge whereby to permit adjustment of said bolt together with said blade in directions normal to said edge; filler means snugly engaged with said bolt and generally complemental to and engaged with the side walls of said non-circular portion of said seat wall hole to restrain said bolt against radial movement therein; and enlargements on the opposite ends of said bolt, one threadedly engaged therewith, for detachably securing said blade in said seat, whereby said blade can be removed, its said faces ground to resharpen said cutting edge, and replaced together with different filler means and with shims between said blade and said seat to reposition said blade so that its sharpened edge will occupy the same position in said seat as it did before sharpening.

2. The structure defined in claim 1 wherein the non-circular portion is formed by a counterbore at one end of the seat wall hole and the filler means is seated in said counterbore.

3. The structure defined in claim 1 wherein there are two filler means disposed in counterbores at the opposite ends of the wall hole which define two non-circular portions.

References Cited in the file of this patent

UNITED STATES PATENTS

| | | |
|---|---|---|
| Re. 22,581 | Opie | Dec. 19, 1944 |
| 996,140 | Reynolds | June 27, 1911 |
| 1,195,538 | Wadhams | Aug. 22, 1916 |
| 1,663,092 | Parys | Mar. 20, 1928 |
| 2,009,660 | Irmis | July 30, 1935 |
| 2,182,162 | Ostberg | Dec. 5, 1939 |
| 2,216,208 | Michon | Oct. 1, 1940 |
| 2,384,674 | Hallewell | Sept. 11, 1945 |
| 2,539,602 | Wehr | Jan. 30, 1951 |
| 2,593,144 | Hercik | Apr. 15, 1952 |
| 2,761,201 | Sylvester | Sept. 4, 1956 |

FOREIGN PATENTS

| | | |
|---|---|---|
| 1,169,750 | France | Sept. 15, 1958 |